T. G. PLANT.
STOPPING MECHANISM.
APPLICATION FILED DEC. 2, 1907. RENEWED APR. 14, 1909.
940,052.
Patented Nov. 16, 1909.
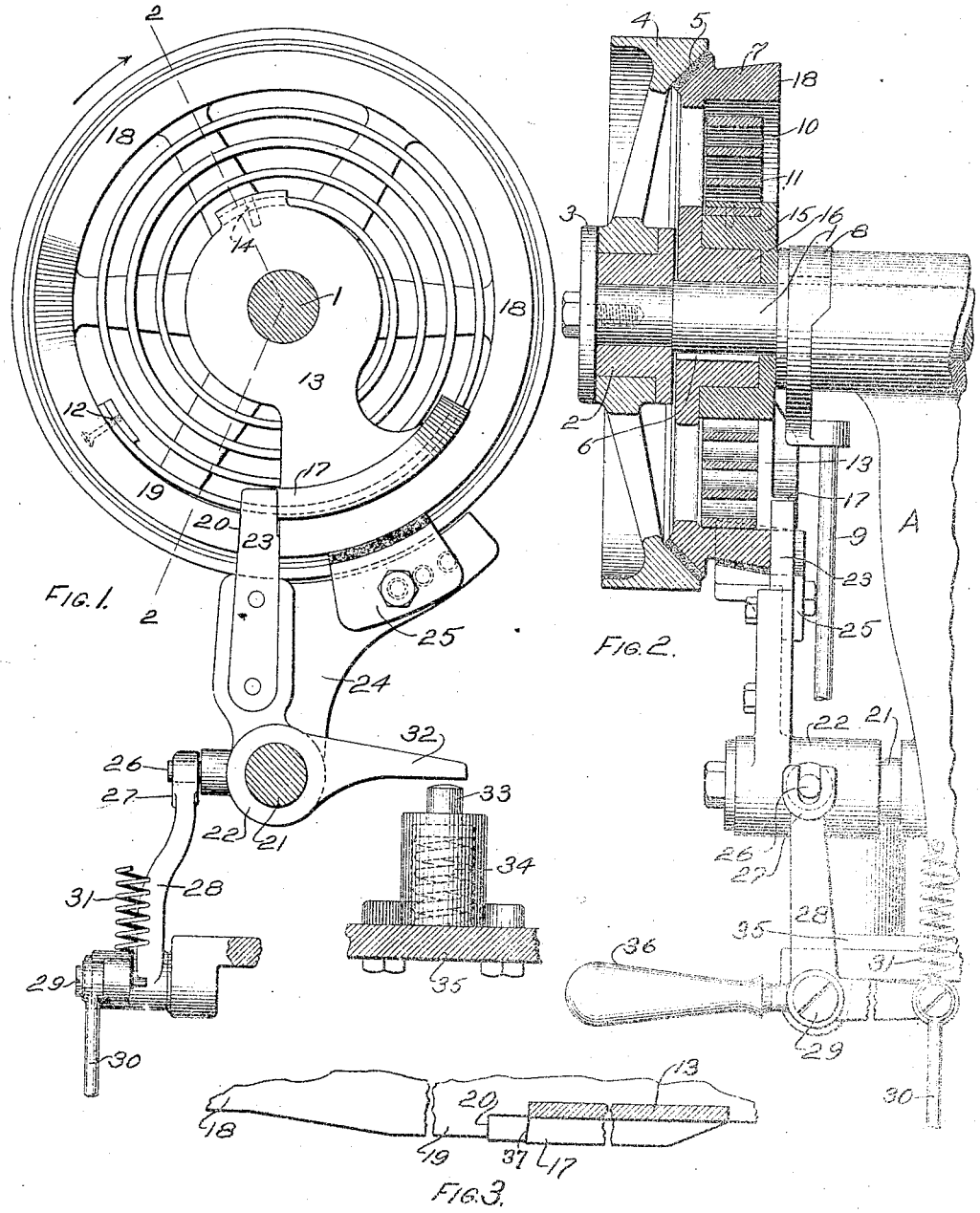

UNITED STATES PATENT OFFICE.

THOMAS G. PLANT, OF BOSTON, MASSACHUSETTS.

STOPPING MECHANISM.

940,052.  Specification of Letters Patent.  Patented Nov. 16, 1909.

Application filed December 2, 1907, Serial No. 404,795.  Renewed April 14, 1909.  Serial No. 489,890.

*To all whom it may concern:*

Be it known that I, THOMAS G. PLANT, a citizen of the United States, residing at Boston, in the county of Suffolk and State of Massachusetts, have invented an Improvement in Stopping Mechanisms, of which the following description, in connection with the accompanying drawings, is a specification, like numerals on the drawings representing like parts.

In many classes of machines, such, for example, as rapid-running sewing-machines, it is desirable, when the machine is stopped, that the parts be brought to rest in a predetermined position, but under high speed the momentum of the parts is considerable, and the difficulty of bringing the machine to rest at a predetermined point without breakage is proportionately great. Attempts have been made to provide stopping mechanism that would secure the desired object and at the same time avoid shock and consequent danger of breakage, but in all these prior efforts the complicated nature of the mechanism has either given only partial satisfaction or introduced other serious objections, as well understood by those skilled in the art.

The object of the present invention is to provide simple, compact and effective means for stopping the machine at a predetermined point with the minimum amount of shock or breakage of parts.

Other objects will appear from the following description of one form or embodiment of the invention selected for illustrative purposes.

In the drawing:—Figure 1 is an end view of a stopping mechanism embodying the present invention, parts being in section and others broken away to better illustrate the operative relation of the elements; Fig. 2 is a sectional view of Fig. 1, on line 2—2, and Fig. 3 is a fragmentary detail showing the relation of the stop arm and the cam faces of the fast and loose stop members to be hereinafter described.

The stop mechanism herein is illustrated as applied to the arm A of a machine for sewing shoes or the like, said arm carrying the driving shaft 1, having loosely mounted thereon by appropriate means, as the sleeve 2 and cap 3, a belt pulley 4 constituting the loose member of a clutch. Secured to the shaft 1 by suitable means, as the spline or key 6, is the fast clutch member 7, the pulley and clutch member having interposed between their adjacent faces a friction material 5, and constituting one form of clutch for connecting the shaft 1 to and disconnecting it from the belt or driving pulley 4, through the sliding wedge block 8 controlled by a treadle rod 9, as will be fully understood by those skilled in the art without further detailed description.

Seated within the recessed face 10 of the clutch member 7 is a spring 11, one end of which is secured at 12 to the clutch member 7, and the opposite end of which is secured to the initial stopping arm 13 at 14, Fig. 1. The arm 13, which for identification is termed the initial stopping arm, consists of a recessed hub portion 15 (Fig. 2) fitted loosely upon the hub portion 16 of the clutch member 7, and having stop member 17 projecting laterally beyond the face plane of the clutch member 7, as indicated in Fig. 2.

The face 18 of the clutch member 7 is provided with a cam 19, extending partially around the circumference of the clutch member and terminating in a reverse stop 20 for a purpose that will presently appear.

Mounted to slide lengthwise of the stud 21 is a sleeve 22, carrying a stop finger 23 and a brake arm 24 provided with an adjustable brake shoe 25.

As one means for moving the sleeve 22 lengthwise upon the stud 21, there is provided a stud 26 projecting from the sleeve and engaging the end 27 of a bell-crank lever, pivoted at 29, and operatively joined to a treadle (not shown) by a rod 30, a spring 31 connected to the bell-crank lever 28 and a part of the frame tending to normally move the sleeve 22 to the left, Fig. 2, to present the stop finger 23 to the stop member 17 of the initial stop 13 and the stop 20 of the clutch member 7, as will be readily understood by those skilled in the art.

Projecting from the sleeve 22 is a lug 32, positioned for contact with a pin 33 supported by a spring 34 seated upon the fixed bracket 35.

From the construction described, it will be understood that upon starting the machine, the treadle controlling sleeve 22 will be manipulated to move the sleeve 22 and the stop 23, Fig. 2, out of the path of movement of the initial stopping arm 13, and the stop 20 on the clutch member, and that said clutch member 7 will be moved by the wedge block 8, or other suitable means, to bring the clutch member into driving engagement with the driving pulley 4. When the machine is to be stopped, the wedge block 8 is raised to remove the driving pressure between the clutch member 7 and pulley 4, and at the same time the sleeve 22 is freed to the action of its spring 31 and moves to the left, Fig. 2, in which position its stop finger 23 rests against the face cam 19 until it is met by the projecting stop member 17. The face 37 of the stop member 17 is beveled as shown, Fig. 3, so that when it engages the stop finger 23, the latter is moved farther to the left, securely locking the initial stopping arm 13 from further rotation. The clutch member 7 continues to rotate in the direction of the arrow, Fig. 1, under the momentum of the machine movements, thus winding up the spring 11 until such momentum is overcome, whereupon the clutch member 7, with its connected machine parts, is given a reverse movement under the stress of the spring 11, and is brought to rest against the stop finger 23.

When the stop member 17 engages the stop finger 23, it tends to turn the sleeve 22 upon its supporting stud, thus forcing the brake shoe against the periphery of the clutch member 7 and operating to overcome the momentum of the machine. When the stop 20 on the reverse movement of the clutch member 7 engages the opposite side of the stop finger 23, it likewise acts to turn the sleeve 22 on its stud but in the opposite direction, the lug 32 at such time being brought into contact with the spring pin 33, thus cushioning the reverse stopping movement. A handle 36 may be provided to operate the bell crank lever 28 and permit the machine to be turned by hand when desired, and various modifications can be made in the particulars illustrated, within the scope of the present invention. For instance, the particular form or character of clutch for connecting the machine to its driving power is not essential, and, indeed, the device may be reformed in many details suggestive to the mind of the ordinary mechanic.

What is claimed and desired to be secured by Letters Patent, is:—

1. A stopping mechanism, comprising in combination, a driving shaft, fast and loose clutch members associated therewith, said fast clutch member having a reverse stop to bring the mechanism to rest upon reverse movement of said shaft, an initial stopping arm mounted for rotative movement with respect to said shaft, a spring having one end connected to the initial stopping arm and the other end connected to the fast clutch member, a stop finger, and means for moving said stop finger into and out of the path of movement of the initial stopping arm and reverse stop.

2. A stopping mechanism, comprising in combination, a driving shaft, fast and loose clutch members associated therewith, said fast clutch member having a reverse stop, an initial stopping arm mounted for rotative movement with respect to said shaft, a spring having one end connected to the initial stopping arm and the other end connected to the fast clutch member, a stop finger, means for moving said stop finger into and out of the path of movement of the initial stopping arm and reverse stop, and yielding means acting through the stop finger to cushion the stopping action of the reverse stop.

3. A stopping mechanism, comprising in combination, a driving shaft, fast and loose clutch members associated therewith, the fast clutch member having a face cam and reverse stop to bring the mechanism to rest upon reverse movement of said shaft, an initial stopping arm having a projecting stop member, a spring having one end connected to the initial stopping arm and the other end connected to the fast clutch member, a stop finger, and means for forcing the stop finger toward the said fixed clutch member to engage the stop finger with the said face cam in the path of movement of the projecting stop member, and thereafter place said stop finger in the path of the reverse stop.

4. A stopping mechanism, comprising in combination, a driving shaft, fast and loose clutch members associated therewith, the fast clutch member having a face cam and reverse stop, an initial stopping arm having a projecting stop member, a spring having one end connected to the initial stopping arm and the other end connected to the fast clutch member, a stop finger, means for forcing the stop finger toward the said fixed clutch member to engage the stop finger with the said face cam in the path of movement of the projecting stop member and thereafter place said stop finger in the path of the reverse stop, and a brake movable with said stop finger.

5. In a stopping mechanism, the combination of a shaft, fast and loose clutch members associated therewith, the fast clutch member having a face cam and reverse stop, an initial stopping arm having a projecting stop member, a spring connecting the initial stopping arm and fast clutch member, a stop finger, and means acting normally to move the stop finger into engagement with said face cam and into the path of movement of the projecting stop member to bring the initial stopping arm to rest, and then into the path of the reverse stop.

6. In a stopping mechanism, the combination of a shaft, fast and loose clutch members associated therewith, said fast clutch member having a recess, an initial stopping arm disposed in said recess and provided with a projecting stop member, a spring also seated in said recess and connecting the fast clutch member and initial stopping arm, said fast clutch member having a face cam and reverse stop, a stop finger, a finger carrier movable toward and from the fast clutch member, and means to move the carrier toward the fast clutch member to place the finger into the path of movement of the projecting stop member and reverse stop.

In testimony whereof, I have signed my name to this specification, in the presence of two subscribing witnesses.

THOMAS G. PLANT.

Witnesses:
WARREN G. OGDEN,
AMELIA M. ROSS.